(12) United States Patent
Konitzer et al.

(10) Patent No.: US 11,813,665 B2
(45) Date of Patent: Nov. 14, 2023

(54) METHODS FOR CASTING A COMPONENT HAVING A READILY REMOVABLE CASTING CORE

(71) Applicant: General Electric Company, Schenectady, NY (US)

(72) Inventors: Douglas Gerard Konitzer, West Chester, OH (US); Brian David Przeslawski, Liberty Township, OH (US); Xi Yang, Mason, OH (US); Meredith Elissa Dubelman, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/019,646

(22) Filed: Sep. 14, 2020

(65) Prior Publication Data
US 2022/0080494 A1 Mar. 17, 2022

(51) Int. Cl.
*B22C 9/10* (2006.01)
*B22D 29/00* (2006.01)
*B33Y 10/00* (2015.01)

(52) U.S. Cl.
CPC ............... *B22C 9/10* (2013.01); *B22C 9/106* (2013.01); *B22D 29/002* (2013.01); *B33Y 10/00* (2014.12); *F05D 2230/211* (2013.01)

(58) Field of Classification Search
CPC ........ B22D 29/002; B22C 9/106; B22C 9/108
See application file for complete search history.

(56) References Cited

U.S. PATENT DOCUMENTS

| | | | |
|---|---|---|---|
| 4,093,017 A | 6/1978 | Miller, Jr. et al. | |
| 4,836,268 A | 6/1989 | Devendra | |
| 5,273,104 A | 12/1993 | Renaud et al. | |
| 5,468,285 A | 11/1995 | Kennerknecht | |
| 5,779,809 A | 7/1998 | Sangeeta | |
| 5,798,066 A * | 8/1998 | Uram ................... | C04B 35/622 264/572 |
| 6,120,713 A * | 9/2000 | Cuisin ................ | B22C 9/04 264/221 |
| 8,393,381 B2 | 3/2013 | Graham et al. | |
| 8,828,214 B2 | 9/2014 | Smallwood et al. | |
| 10,040,115 B2 | 8/2018 | Slavens et al. | |
| 10,099,284 B2 | 10/2018 | Simpson et al. | |
| 2003/0062145 A1 | 4/2003 | Frasier et al. | |
| 2016/0175923 A1* | 6/2016 | Liu ........................ | B22C 9/24 164/271 |
| 2017/0087631 A1 | 3/2017 | Gold | |
| 2017/0173671 A1 | 6/2017 | Auxier et al. | |

(Continued)

*Primary Examiner* — Kevin E Yoon
*Assistant Examiner* — Jacky Yuen
(74) *Attorney, Agent, or Firm* — Dority & Manning, P.A.

(57) ABSTRACT

A method is provided for casting a component. Accordingly, a casting core is provided within a cavity of a component mold. The casting core defines an inner component shape and includes a core wall. The core wall defines a core outer surface and a core inner surface disposed opposite the core outer surface. The core inner surface defines a core cavity. The casting core also includes a removal facilitation feature. The component is cast within the cavity of the component mold with the casting core positioned therein. The cast component is removed from the component mold and the casting core is removed from the cast component.

11 Claims, 9 Drawing Sheets

(56) References Cited

U.S. PATENT DOCUMENTS

| | | |
|---|---|---|
| 2017/0173674 A1 | 6/2017 | Arnett et al. |
| 2017/0173682 A1 | 6/2017 | Simpson |
| 2017/0246678 A1 | 8/2017 | Bunker et al. |
| 2020/0157847 A1 | 5/2020 | Liu |
| 2020/0157947 A1 | 5/2020 | Osgood et al. |

* cited by examiner

METHODS FOR CASTING A COMPONENT HAVING A READILY REMOVABLE CASTING CORE

FIELD

The present subject matter relates generally to the production of components for gas turbine engines, and more particularly, to a removable casting core and method of manufacturing.

BACKGROUND

Gas turbine engine components, such as turbine airfoils, are frequently manufactured using an investment casting process in which molten metal alloy is introduced into a mold cavity defined between a shell and a core and allowed to solidify, forming a completed casting. A time-consuming step in the manufacturing process is removal of the core after the casting is complete.

The removal of the core after casting often involves leaching out the core material with a caustic solution (usually aqueous sodium hydroxide or potassium hydroxide for ceramic cores). In the future, this challenge will be magnified as higher temperature, yttrium-containing alloys are used, requiring non-reactive casting core materials such as alumina- and zirconia-based ceramics. These core materials leach much more slowly than silica-based materials currently in use.

Additionally, process improvements in other aspects of the production cycle have highlighted a production bottleneck resulting from current leaching techniques. The requirement to use multiple leaching cycles, often spread over days, slows down and disrupts the consistent part flow through the processing facility. Reducing this disruption will reduce work-in-progress inventories and facilitate faster, more consistent part flow.

Accordingly, there remains a need for a casting core that is readily removable.

BRIEF DESCRIPTION

Aspects and advantages of the invention will be set forth in part in the following description, or may be obvious from the description, or may be learned through practice of the invention.

In one aspect, the present disclosure is directed to a method for casting a component. The method may include providing a casting core within a cavity of a component mold. The cavity of the component mold may define an outer component shape and the casting core may define an inner component shape. The casting core may include a core wall. The core wall may define a core outer surface and a core inner surface disposed opposite the core outer surface. The core inner surface may define a core cavity and the casting core may include a removal facilitation feature. The method may also include casting the component within the cavity of the component mold with the casting core positioned therein. Additionally, the method may include removing the cast component from the component mold, with the casting core positioned internally within the component. The method may further include removing the casting core from the cast component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In general, the present subject matter is directed to a method for forming a cast component. The method may include a number of processes each of which may also be a method. These processes may include the casting of the component and the formation of the casting core to be used in the component casting process. The casting core may be formed by various manufacturing methods including casting and additive manufacturing. The casting core may be formed with removal facilitation features, which enable the casting core to be more easily removed from the cast component. The removal facilitation features may include cavities, support webs, or easily-removable sub-cores. Generally, the removal facilitation features enable a leaching solution to contact a greater surface area of the casting core at one time then would be accessible using known techniques. With a greater surface area of the casting core being affected at once, the casting core may be more quickly removed from the cast component.

Figure 1:
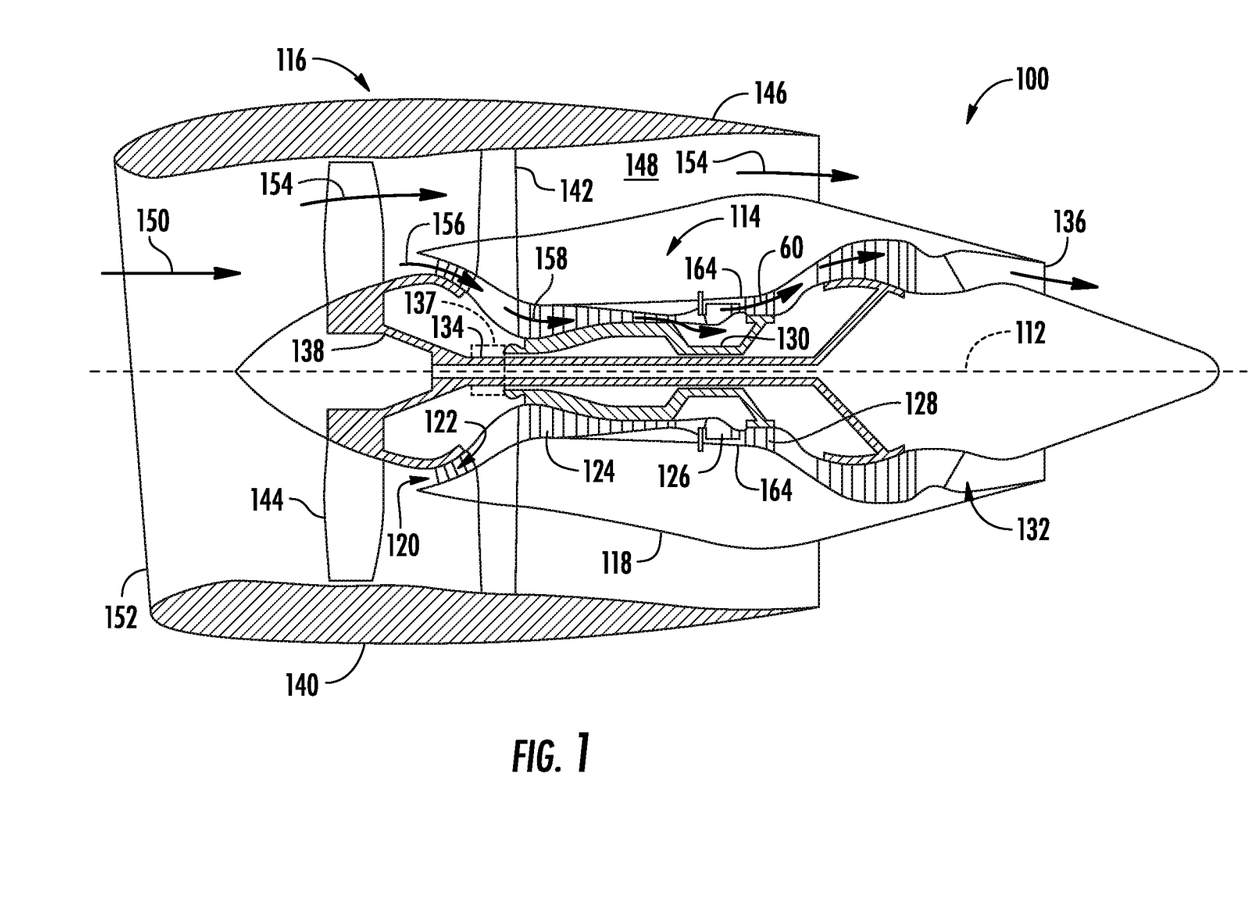
FIG. 1 illustrates a schematic cross-sectional view of one embodiment of a gas turbine engine for use in in accordance with the present disclosure.

Referring now to the drawings, FIG. 1 illustrates a cross-sectional view of one embodiment of a gas turbine engine 100 that may be utilized with an aircraft in accordance with aspects of the present subject matter. Various components of the gas turbine engine 100 may be formed via the methods for casting a component disclosed herein. The engine 100 is shown having a longitudinal or axial centerline axis 112 extending therethrough for reference purposes. The engine 100 will be discussed in detail below. Although shown as a turbofan jet engine, the methods described herein may be used on any turbomachine including, but not limited to, high-bypass turbofan engines, low-bypass turbofan engines, turbojet engines, turboprop engines, turboshaft engines, propfan engines, and so forth. The turbomachine may be configured in any suitable manner, such as for vehicle propulsion or ground-based power production.

Figure 2A:
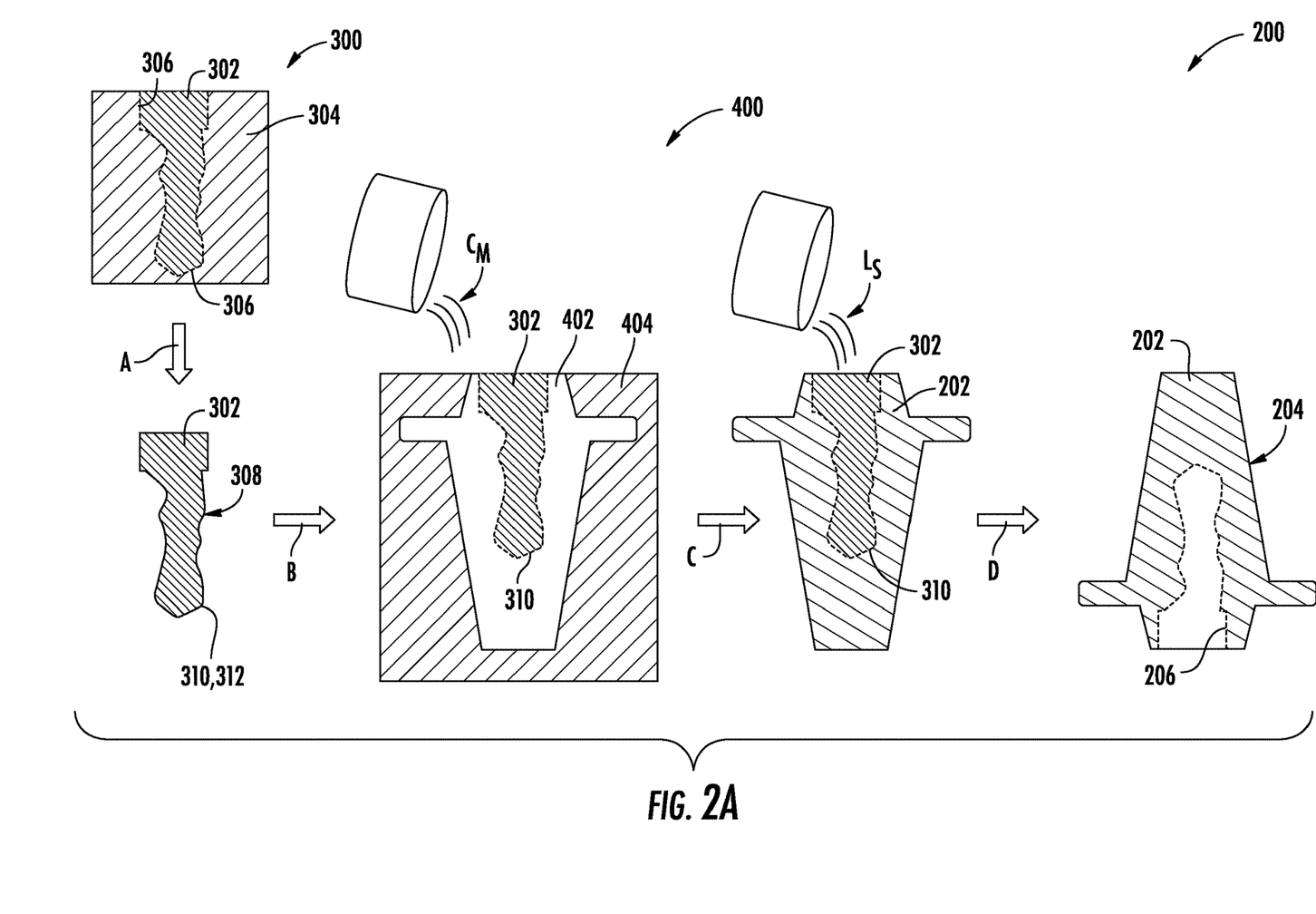
FIGS. 2A and 2B illustrate schematic views of methods for forming a cast component in accordance with the present disclosure.
Figure 2B:
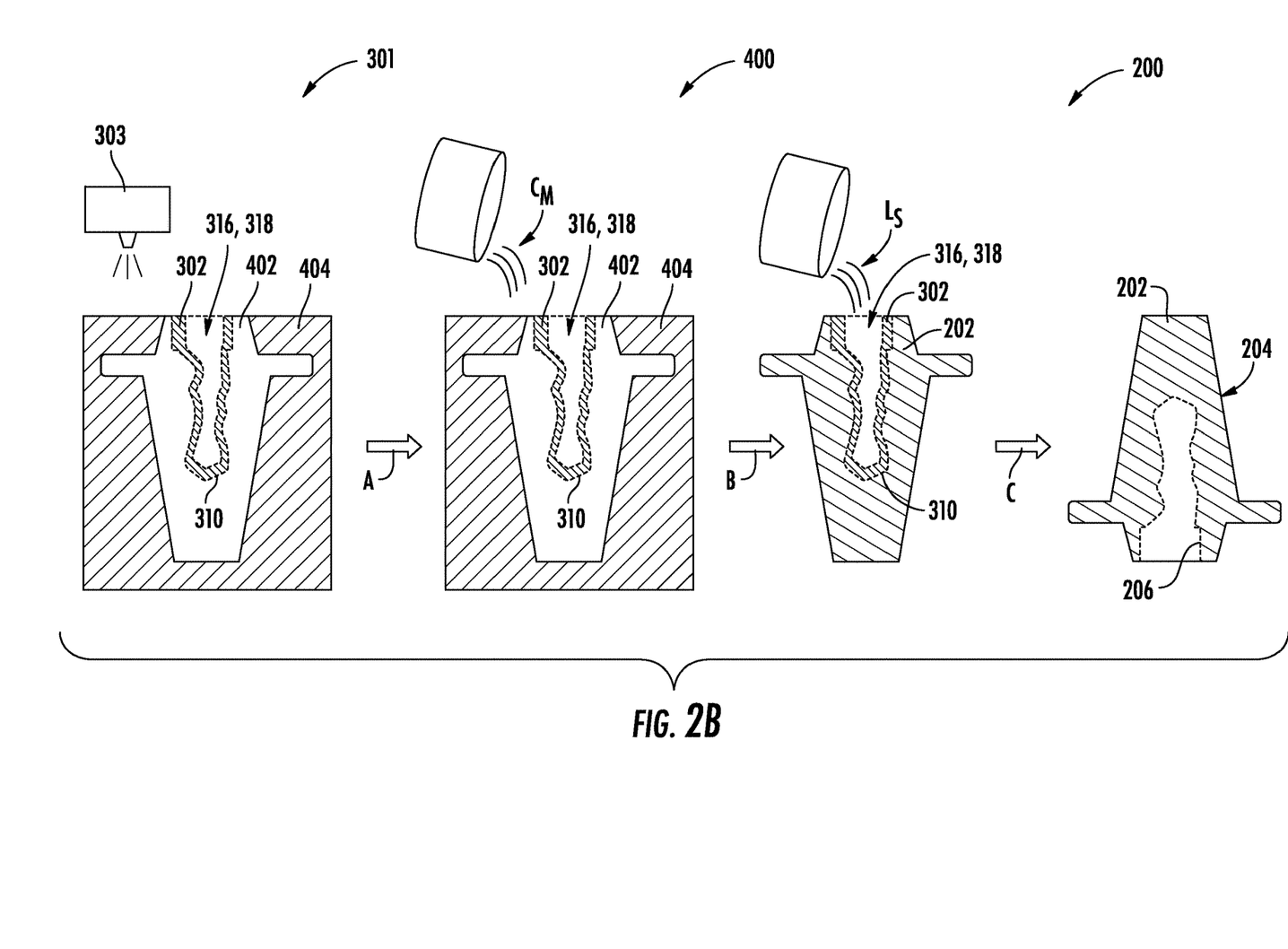

FIGS. 2A-2B illustrate schematic views of a method 200 for forming a cast component 202. As depicted in FIGS. 2A-2B, the method 200 for forming a cast component 202 may include a plurality of processes, each of which, may also be a method. For example, the method 200 may include a core-formation method 300 or 301 and a component casting process 400. As will be more fully detailed below, the method 200 may generally include the steps of forming a casting core 302 via the core-formation method 300 or 301 and providing the casting core 302 within a cavity 402 of a component mold 404. In accordance with the component casting process 400, the cast component 202 may be cast within the cavity 402. The casting core 302 may then be removed from the cast component 202. In one embodiment, the cast component 202 is a turbine engine component of the gas turbine engine 100. It should be appreciated that the progression of steps, or processes, in the method 200 for forming a cast component 202 is represented in FIG. 2A by arrows A-D and in FIG. 2B by arrows A-C. As shown, the method 200 may include two distinct molds, the component mold 404 used in the component casting process 400 and a core mold 304 used in method 300, and the casting core 302 produced using the core mold 304 may be positioned subsequently into the component mold 404. In an alternative embodiment, the method 200 may use only a single mold, the component mold 404 in the component casting process 400, and the casting core 302 may be provided to the component mold 404 by simultaneously forming the casting core 302 and component mold 404 via an additive manufacturing device 303 by an additive manufacturing method 301 in FIG. 2B. Additionally, two distinct cores may be used, the casting core 302 and a sub-core 324 (FIGS. 4A-4B), wherein the sub-core 324 may be separately formed and positioned in the casting core 302 or may be simultaneously formed with the casting core 302.

As depicted in FIG. 2A, the core-formation method 300 may include the core mold 304. The core mold 304 may be formed with a core mold inner face 306, which is the negative of a casting core outer shape 308. The casting core 302 may be a hollow core and may comprise a core wall 310 defining a core outer surface 312 and a core inner surface (FIG. 3B, 314) disposed opposite the core outer surface 312. The core inner surface 314 may define a core cavity (FIG. 3B, 316). The casting core 302 may also include a removal facilitation feature (FIG. 3B, 318), as will be discussed in more detail below. It should be appreciated that the inclusion of the core mold 304 in FIG. 2A is not intended to limit the core-formation method 300 to a particular manufacturing method, such as casting. Rather, the casting core 302 may be formed by any suitable manufacturing method. For example, the casting core 302 may be an additive manufacturing product, thereby eliminating Step A in FIG. 2A. Further, the casting core 302 may be separately produced by additive manufacturing and positioned into the component mold 404 as in FIG. 2B, or both the casting core 302 and component mold 404 may be an additive manufacturing product, produced simultaneously.

The casting core 302 may be constructed from a refractory material capable of maintaining structural integrity when exposed to molten metal alloys at high temperatures. For example, the core may be formed from a solid ceramic material. Nonlimiting examples of ceramics include those based on silica, alumina, calcium, magnesium, zirconia, and other refractory oxides. Materials such as alumina- and zirconia-based ceramics are considered nonreactive with certain metal alloys. In one embodiment, the casting core 302 may be constructed of a core material ($M_C$) that may be brittle between 1314° C. and 21° C.

As previously stated, the component casting process 400 may include a component mold 404 that may define a cavity 402. The cavity 402 may define an outer component shape 204 of the cast component 202. The casting core 302 may be provided within the cavity 402 of the component mold 404 so that the casting core 302 defines an inner component shape 206. With the casting core 302 positioned within the component mold 404, molten component material ($C_M$) may be introduced into the component mold 404 to form the cast component 202. Once the component material ($C_M$) has cooled and solidified, the cast component 202, with the casting core 302 positioned internally within the cast component 202, may be removed from the component mold 404. In at least one embodiment, a caustic leaching solution ($L_S$) may be applied to the casting core 302 to leach the casting core 302 from within the cast component 202. It should be appreciated that in order to remove the casting core 302 from within the cast component 202, the caustic leaching solution ($L_S$) must be brought into contact with the casting core 302. As such, the amount of surface area of the casting core 302 that may be affected by the leaching solution ($L_S$) at any given time may affect the rate at which the leaching process proceeds. Accordingly, in at least one embodiment, the removal facilitation feature 318 may be a feature of the casting core 302 that increases the amount of surface area of the casting core 302 that may be affected by the leaching solution ($L_S$) at any given time.

It should be appreciated that increasing the surface area of the casting core 302 may increase the effectiveness of other core removal techniques. For example, in at least one embodiment, a water jet may be employed to remove the casting core 302 from within the cast component 202. In such an embodiment, the greater the surface area of the casting core 302 that may be subjected to the waterjet, the more effective the waterjet may be at removing the casting core 302 from the cast component 202. In another exemplary embodiment, the casting core 302 may be subjected to a vibration. In such an embodiment, an increase in surface area of the casting core 302 may permit a greater vibrational movement of the casting core 302, which may lead to the fracturing and removal of the casting core 302.

Figure 3A:
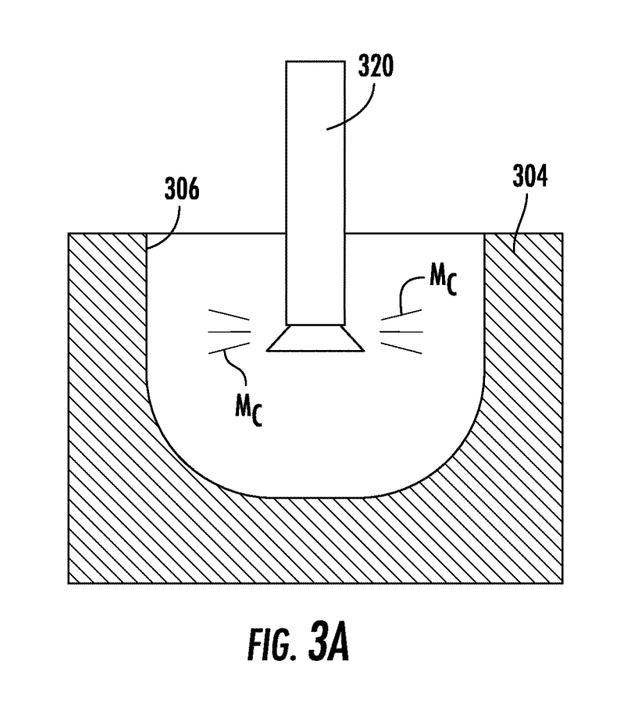
FIG. 3A illustrates a schematic cross-sectional view of one embodiment of a method for forming a casting core for use in the exemplary method of FIG. 2A.
Figure 3B:
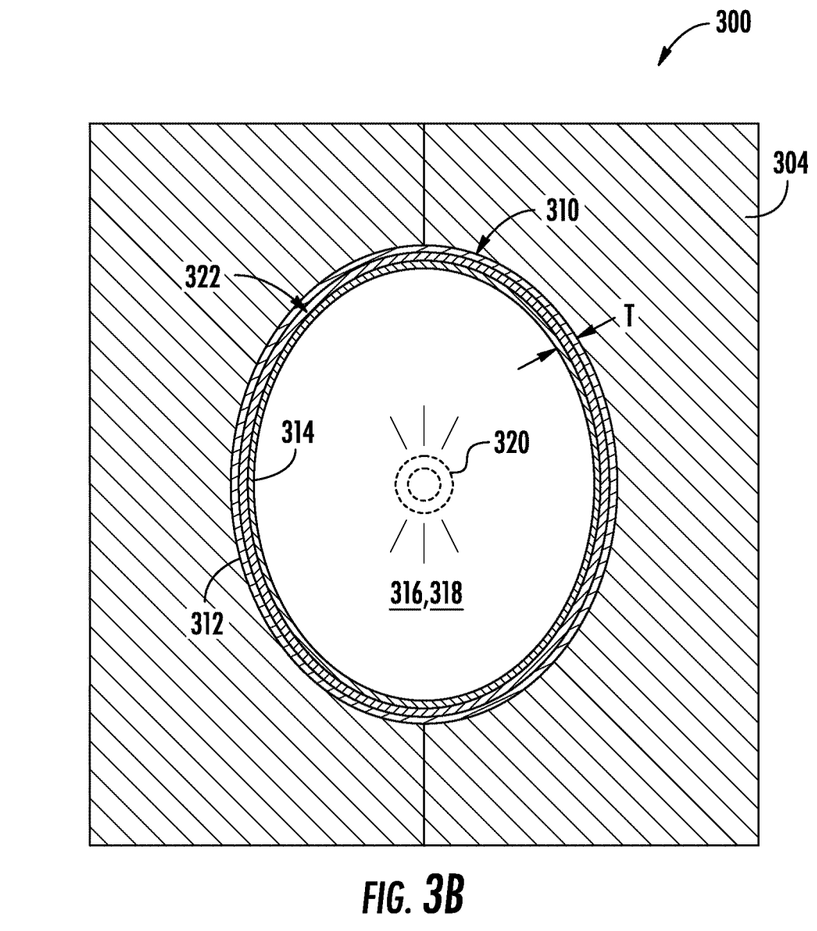
FIG. 3B illustrates a schematic top view of one embodiment of a method for forming a casting core for use in the exemplary method of FIG. 2A.

FIG. 3A illustrates a schematic cross-sectional view of an embodiment of a method for forming a casting core for use in the exemplary method 200. As depicted in FIG. 3A, the core-formation method 300 may include an injection apparatus 320. The injection apparatus 320 may be inserted into the core mold 304. With further reference to FIG. 3B, in an embodiment, the injection apparatus 320 may deposit one or more layers 322 of core material ($M_C$) on the core mold inner face 306 to form the core wall 310. In at least one embodiment, the injection apparatus 320 may deposit sufficient core material ($M_C$) to establish a core wall thickness (T) of 0.1 mm to 5 mm. The casting core 302 may have a core wall 310 comprising a single core layer 322 having the core wall thickness (T) of 0.1 mm to 5 mm. In an alternative embodiment, as shown in FIG. 3B, the core wall 310 may comprise a plurality of core layers 322 to establish the core wall thickness (T) of 0.1 mm to 5 mm. By way of further example, the core wall thickness (T) may be 0.1 mm to 4 mm, 0.5 mm to 4 mm, 0.5 mm to 2.5 mm, 0.1 mm to 2.5 mm, 1 mm to 3 mm, or 2 mm to 4 mm. It should be appreciated that, in at least one embodiment, the thickness (T) may be the removal facilitation feature 318. As such, the thickness (T) may be selected to ensure the casting core 302 is of sufficient strength to resist compression as the cast component 202 is cast, while minimizing the amount of core material ($M_C$) to be removed and maximizing the amount of surface area of the casting core 302 that may be affected by the leaching solution ($L_S$) at any given time.

With specific reference to the embodiment of FIG. 3B, the core wall 310 may comprise a plurality of core layers 322. The injection apparatus 320 may deposit successive core layers 322 until the core wall thickness (T), e.g., 0.1 mm to 5 mm, is achieved. In an exemplary embodiment wherein the injection apparatus 320 deposits successive core layers 322, the injection apparatus 320 may be inserted into the core mold 304 and may deposit a core layer 322 as the injection apparatus 320 is withdrawn from the core mold 304. The injection apparatus 320 may then be reinserted into the core mold 304 and may deposit an additional core layer 322 as the injection apparatus 320 is again withdrawn from the core mold 304. The process of inserting the injection apparatus 320 and depositing a core layer 322 may be repeated until the core wall thickness (T), e.g., 0.1 mm to 5 mm, is achieved.

In the various embodiments in accordance with the present disclosure, the removal facilitation feature 318 may include structures and materials that may serve to make the casting core 302 more susceptible to known removal processes. For example, the core wall 310 may have sufficient strength to resist deformation during the component casting process 400 and, thus, the core cavity 316 may be formed without the inclusion of any additional support elements. In such an embodiment, the entirety of the surface area of the core inner surface 314 may be simultaneously exposed to known leaching processes. In additional embodiments, the casting core 302 may include, within the core cavity 316, additional support structures as may be necessary to reduce, or eliminate, deformation of the casting core 302 during the casting process. In such embodiments, the removal facilitation features 318 may include filling the core cavity 316 with a highly-removable sub-core or a support web to provide structural support while maintaining a maximal surface area that may be instantly exposed to a removal process, such as leaching.

Figure 4A:
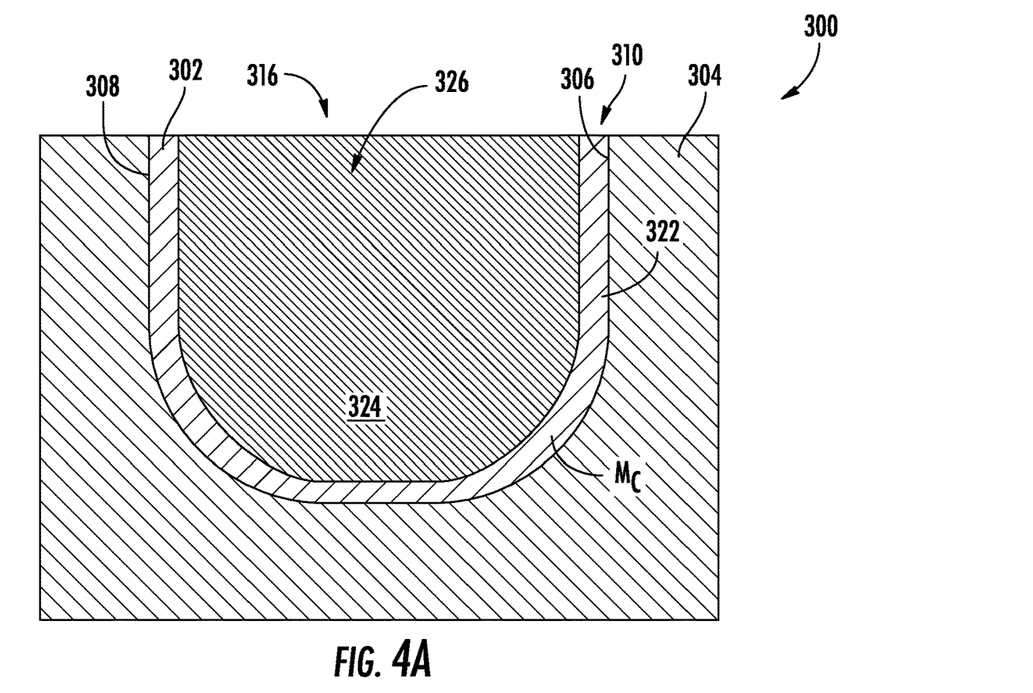
FIG. 4A illustrates a schematic cross-sectional view of one embodiment of a method for forming a casting core, which may have a sub-core, for use in the exemplary method of FIG. 2A.

FIG. 4A illustrates a schematic cross-sectional view of one embodiment of a method for forming a casting core, which may have a sub-core, for use in the exemplary method 200. As depicted in FIG. 4A, the core-formation method 300 may include a sub-core 324 comprising a sub-core material 326. The core mold 304 may be formed with a core mold inner face 306 that is the negative of a casting core outer shape 308. The sub-core 324 may be secured within the core mold 304 and a portion of core material ($M_C$) may be introduced into the core mold 304 to form the core wall 310 as a single core layer 322. Once the core material ($M_C$) has cooled and solidified, the casting core 302 may be removed from the core mold 304. The sub-core 324 may be removed from the casting core 302 to expose the core cavity 316.

The sub-core material 326, in an alternative embodiment, may comprise an easily removable material yet possess sufficient rigidity to provide structural support to the casting core 302. As such, the sub-core 324 may be easily removable, and may be the removal facilitation feature 318 within the core cavity 316. In such an embodiment, the sub-core 324 may be maintained in the casting core 302 until the cast component 202 is cast. Once the cast component 202 is cast, the sub-core 324 may be exposed to rapid leaching and removed from the casting core 302. The rapid leaching of the sub-core 324 may expose a greater surface area of the casting core 302 to the leaching process.

In another embodiment as depicted in FIG. 4A, the casting core 302 may be formed by any of the methods described herein, wherein the casting core 302 is formed with the core cavity 316. The sub-core 324, comprising the sub-core material 326, may be formed separately and inserted into the core cavity 316. In such an embodiment, the casting core 302 may have a core wall thickness (T) of 0.1 mm to 5 mm and may be structurally supported by the spanning of the core cavity 316 by the sub-core 324. Because the sub-core material 326 may be an easily removable material, the sub-core 324 may be the removal facilitation feature 318 within the core cavity 316.

Figure 4B:
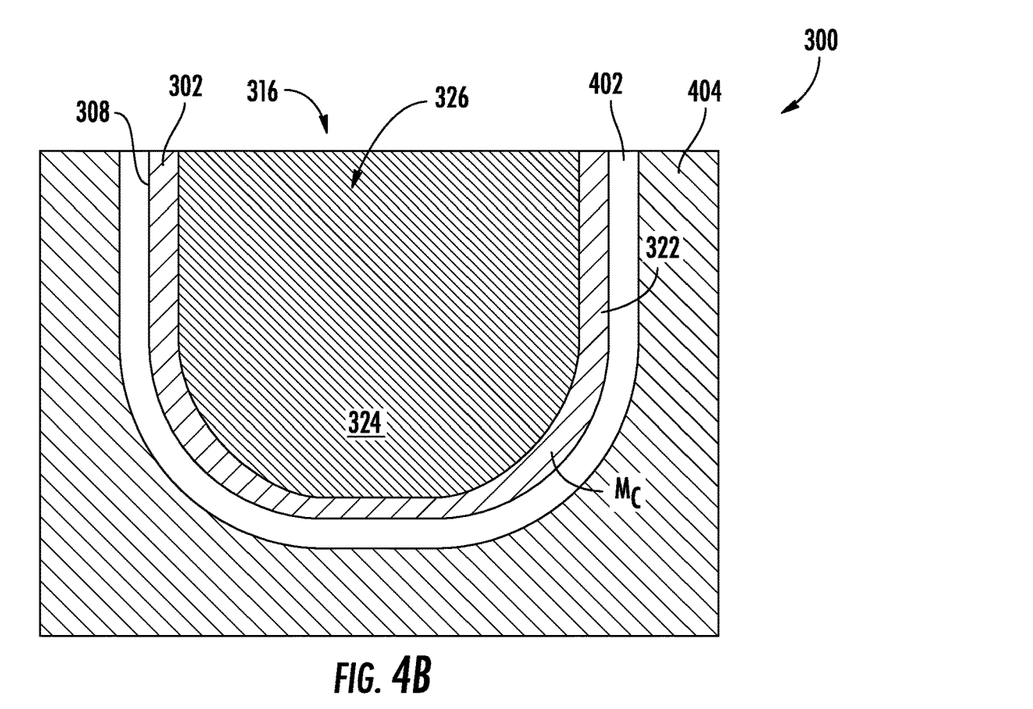
FIG. 4B illustrates a schematic cross-sectional view of one embodiment of a method for forming a casting core, which may have a sub-core, simultaneously with forming a component mold, for use in the exemplary method of FIG. 2B.

In yet another embodiment as depicted in FIG. 4B, multi-material additive manufacturing may be used to form the casting core 302, sub-core 324, and component mold 404 simultaneously. The casting core 302 with the sub-core 324 therein may thus be provided to the component mold 404 simultaneously with formation of the component mold 404. The cavity 402 may include one or more features (not shown) connecting the casting core 302 to the component mold, which may serve as support structures during casting, and which may leach out to form features, such as holes and passages, in the cast component 202. Alternatively, the sub-core 324 may be formed separately and thereafter inserted into the additively manufactured casting core 302 and component mold 404 to provide support during the subsequent component casting process 400.

Figure 5A:
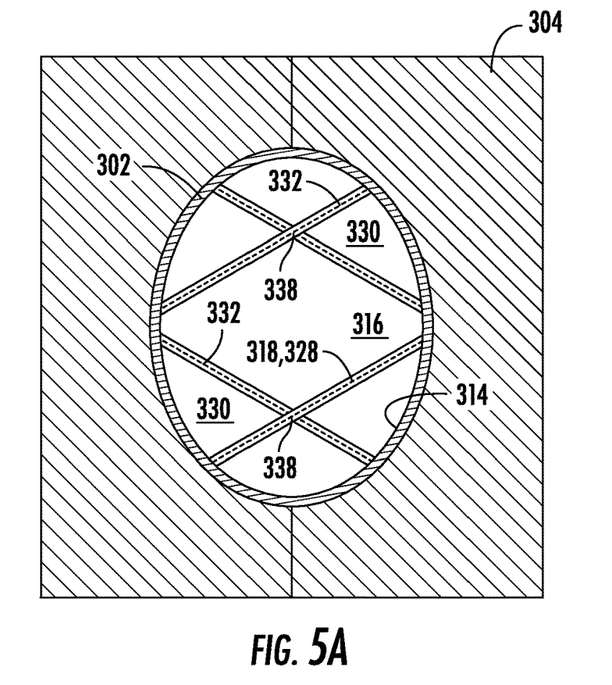
FIG. 5A illustrates a schematic top view of one embodiment of a method for forming a casting core, which may have a support web, for use in the exemplary method of FIG. 2A.
Figure 5B:
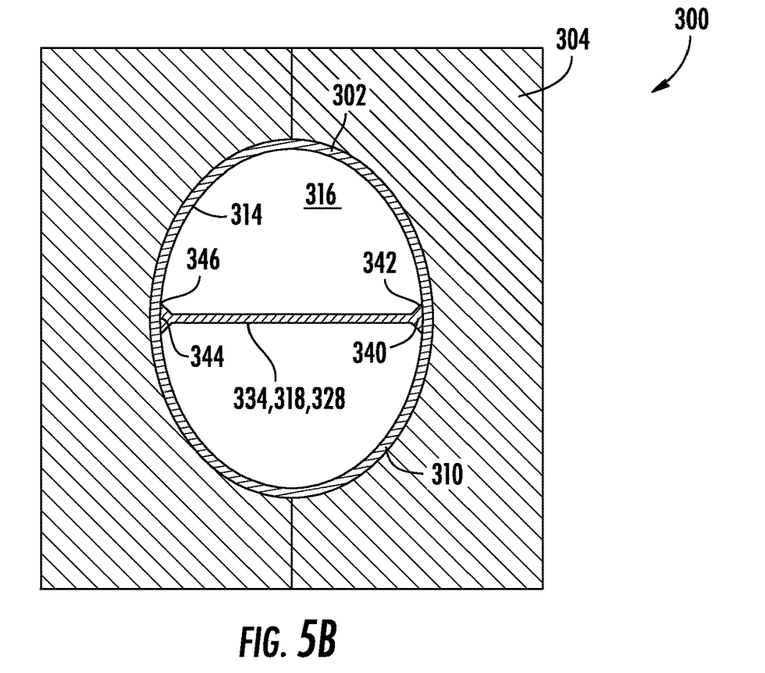
FIG. 5B illustrates a schematic top view of one embodiment of a method for forming a casting core, which may have a support web comprising a single structural member, for use in the exemplary method of FIG. 2A.
Figure 5C:
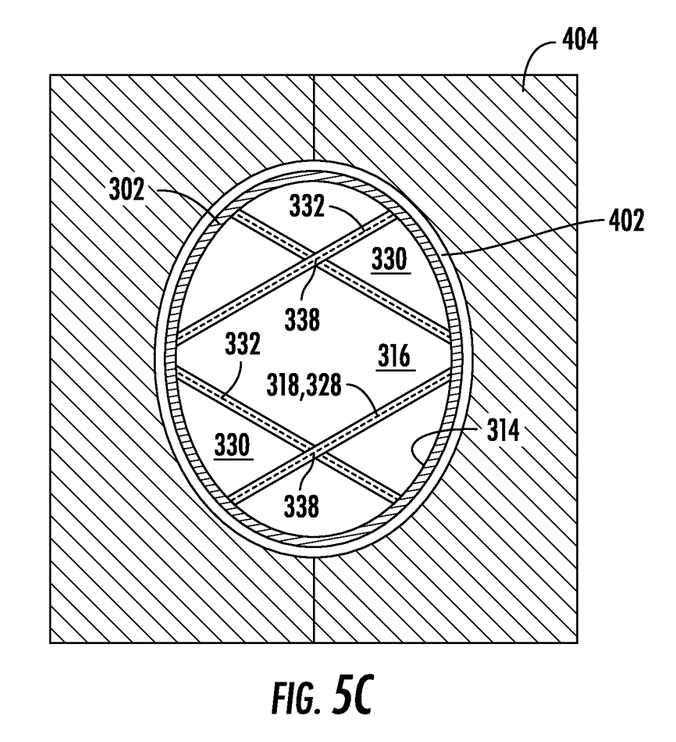
FIG. 5C illustrates a schematic top view of one embodiment of a method for forming a casting core, which may have a support web, simultaneously with forming a component mold, for use in the exemplary method of FIG. 2B.

FIGS. 5A, 5B, 5C, and 6 illustrate schematic top views of embodiments of a method for forming a casting core, which may have a support web, for use in the exemplary method 200. As depicted in FIGS. 5A-5C, the core formation methods 300 and 301 may include a support web 328 contained within the core cavity 316 and coupled to the core inner surface 314. The support web 328 may be a removal facilitation feature 318 within the core cavity 316. The support web 328 may comprise a plurality of pores, cavities, or voids 330. The plurality of pores, cavities, or voids 330 may facilitate penetration of a caustic leaching solution ($L_S$) during core removal. In other words, because the support web 328 permits the penetration of the caustic leaching solution ($L_S$), maximal surface area of the core inner surface 314 may be exposed to the leaching process at once. Additionally, the plurality of pores, cavities, or voids 330 may increase the effectiveness of other core removal methods, such as a water jet or vibration.

Figure 6:
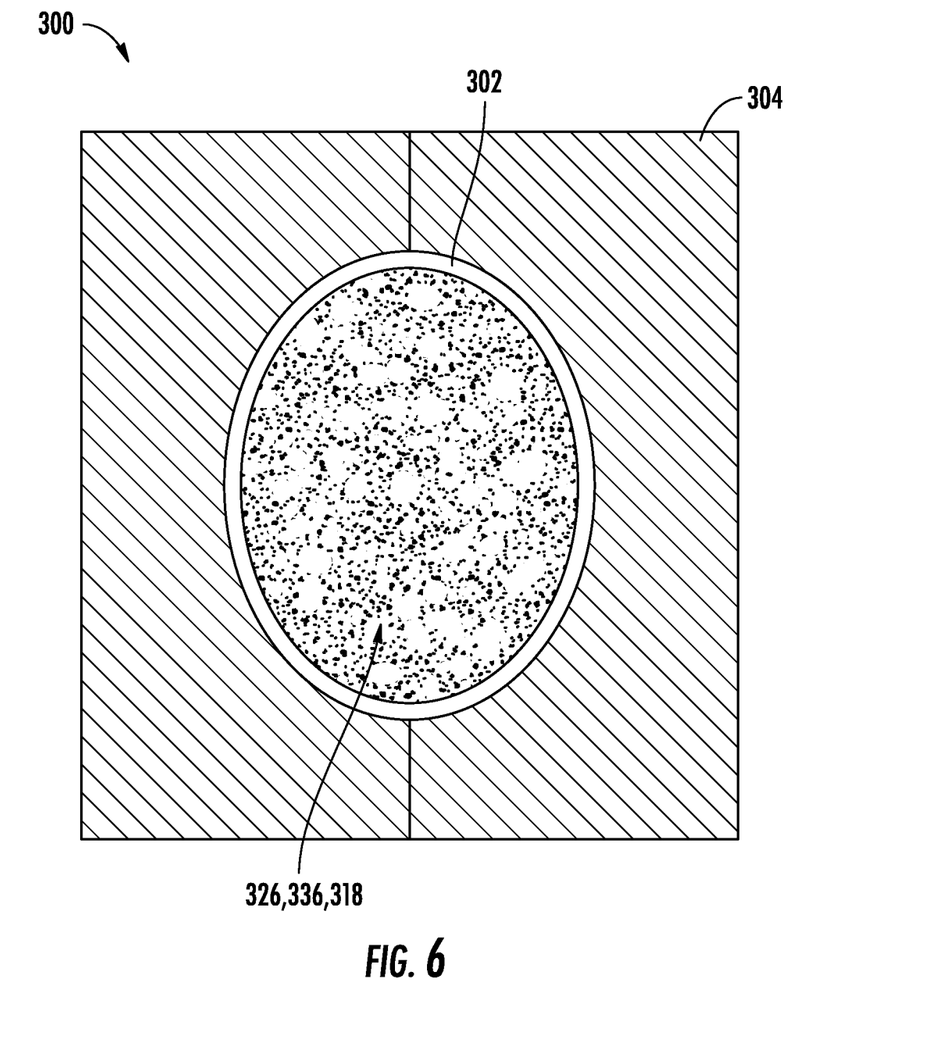
FIG. 6 illustrates a schematic top view of one embodiment of a method for forming a casting core, which may have a support web comprising a foam, for use in the exemplary method of FIG. 2.

In addition to facilitating transportation of the leaching solution ($L_S$) into and out of the core cavity 316, the support web 328 may be configured to provide structural support for the core 302. The support web 328 may ensure mechanical support is provided in areas subject to high stress during the component casting process 400. The support web 328 may also limit or control thermal expansion of the core 302 during the casting process. The support web 328 may take any suitable form including a plurality of support members 332, a single structural member 334, or a foam (FIG. 6, 336). It should be appreciated that the web 328 may be formed from the core material ($M_C$), the sub-core material 326, or other suitable material.

In an embodiment such as depicted in FIGS. 5A and 5C, the support web 328 may comprise a plurality of support members 332. The plurality of support members 332 may span the core cavity 316 and be coupled to the core inner surface 314. At least two support members of the plurality of support members 332 may meet at an intersection 338. In one embodiment, the plurality of support members 332 may be arranged in a repeating pattern to form a lattice structure having a plurality of intersections 338. The plurality of support members 332 may intersect the core inner surface 314 at specific locations where a high stress load is computed. For example, the location having a high stress load may be a gradient peak having a stress concentration value which is greater than the stress concentration of at least one adjacent region. In such an embodiment, the arrangement of the plurality of support members 332 may have no discernible pattern and may not include the intersection 338. In one embodiment, the plurality of support members 332 may comprise a plurality of beams. In another embodiment, the plurality of support members 332 may comprise a plurality of dividers or walls extending. Each divider or wall may be a unitary structure extending substantially along the core inner surface. For example, in at least one embodiment, each divider wall may have an edge length substantially equal to a depth of the core cavity 316. In yet another embodiment, the plurality of support members 332 may comprise at least one beam and at least one divider or wall, wherein the at least one beam has a maximal length greater than a maximal thickness. It should be appreciated that, in an exemplary embodiment, the plurality of support members 332 may form a lattice structure, such as a honeycomb, on the core inner surface 314. The lattice structure may conform to the shape of the core inner surface 314 and may not span the core cavity 316.

FIG. 5B depicts an embodiment wherein the support web 328 may comprise a single structural member 334. The single structural member 334 may have a first support end 340 coupled to a first inner surface attachment location 342 and a second support end 344 coupled to a second inner surface attachment location 346. The first inner surface attachment location 342 and the second inner surface attachment location 346 may be located along the core inner surface 314 at locations selected to orient the single structural member 334 to ensure mechanical support is provided in areas subject to high stress during the component casting process 400. It should be appreciated that in one embodiment, the single structural member may be a beam, and in an additional embodiment, the single structural member may be a divider or wall.

In an embodiment in accordance with FIGS. 5A and 5B, the core formation method 300 may include forming the casting core 302 by a casting process. In one embodiment wherein the casting core 302 is formed by casting, the sub-core 324 may be formed to integrate the support web 328. In such an embodiment, the sub-core 324, integrating the support web 328, may remain in the casting core 302 following the removal of the casting core 302 from the core mold 304. The casting core 302, containing the integrated support web 328, may then be employed in the component casting process 400 as previously discussed. In an alternative embodiment, the sub-core 324 may be formed to integrate the support web 328 into the core inner surface 314. Following the casting of the casting core, the sub-core 324 may be removed from the casting core 302 leaving the casting core 302 and the support web 328 as a unitary structure.

The support web 328 may, in an exemplary embodiment, be an additive manufacturing product. The sub-core 324 integrating the support web 328 may be produced through additive manufacturing processes. The sub-core 324 may then be employed in the core formation process 300 to form the casting core 302. In an additional embodiment, the support web 328 may be incorporated into the casting core 302 as a unitary structure. The casting core 302 and the integrated support web 328 may be produced via additive manufacturing processes. As shown in FIG. 5C, the component mold 404 also may be simultaneously formed via the additive manufacturing process, or it may be formed separately and the additively manufactured casting core 302 with integrated support web 328 may thereafter be positioned in the cavity 402. It should be appreciated that the support web 328 may, alternatively, be additively manufactured and inserted into the core cavity 316 of the core 302 produced by any of the processes discussed above.

FIG. 6 depicts an embodiment wherein the support web 328, and thus the removal facilitation feature 318, comprises a foam 336. The foam 336 may be any suitable material. For example, the foam may be a ceramic foam, a metallic foam, or an expanding foam. In one embodiment, the foam 336 may be the sub-core material 326 and the foam 336 may be the sub-core 324. The foam 336, when employed as the sub-core 324, may be used in the core formation process 300 when casting the casting core 302. In an alternative embodiment, the casting core 302 may be formed with the core cavity 316 by any of the processes described herein. The foam 336 may be inserted into the core cavity 316 to provide structural support to the casting core 302 while still permitting the leaching solution ($L_S$) to penetrate into the core cavity 316 during the leaching process. Similarly, in one embodiment, the core cavity 316 may be formed as discussed above. The foam 336 may be an expanding foam that may be introduced into the cavity 316 and permitted to expand and fill the cavity 316. The expanding foam may also comprise a material that is highly removable. The expanding foam may be formulated with a ceramic and have a self-skinning feature wherein the foam 336 may expand to fill the cavity 316 and form a skin at the surface. The support web 328, when comprising the foam 336, may be the removal facilitation feature 318.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component that may have a variety of integral sub-components. Although additive manufacturing technology is described herein for the fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, wax, or any other suitable material. These materials are examples of materials suitable for use in the additive manufacturing processes described herein and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any application. In addition, the components described herein may be constructed entirely by additive manufacturing processes, or all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component as depicted in FIGS. 2A-6.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material or polymerize a liquid. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of the components may vary as needed depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of additive ceramic or additive plastic, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. In addition, the additive manufacturing process enables the manufacture of a single component having different materials such that different portions of the component may exhibit different performance characteristics. The successive, additive nature of the manufacturing process enables the construction of these novel features. As a result, the components described herein may enable more intricate internal cast component shapes.

Figure 7:
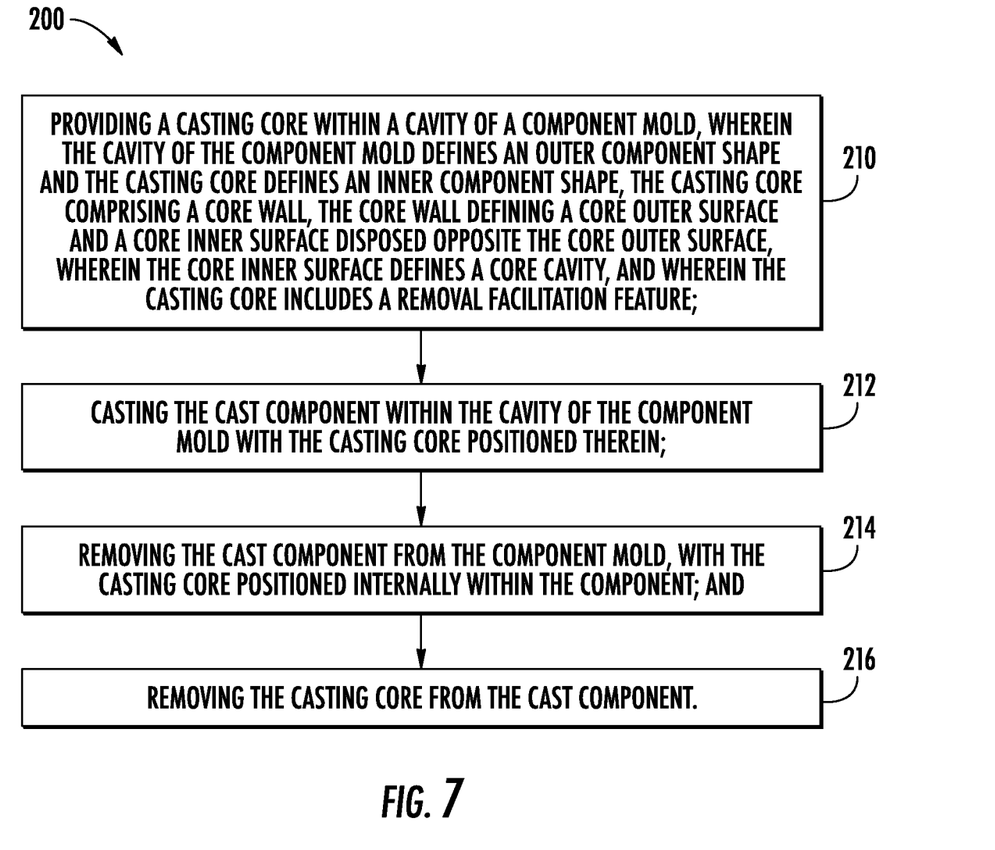
FIG. 7 provides a flow diagram for casting a component as illustrated by the exemplary methods of FIGS. 2A and 2B.

Referring now to FIG. 7, a flow diagram of a method 200 for casting a component is presented. The exemplary method 200 includes at 210 providing a casting core within a cavity of a component mold. The cavity of the component mold may define an outer component shape and the casting core may define an inner component shape. The casting core may comprise a core wall, the core wall defining a core outer surface and a core inner surface disposed opposite the core outer surface. The core inner surface may define a core cavity, and the casting core may include a removal facilitation feature. The exemplary method 200 includes at 212, casting the component within the cavity of the mold with the casting core positioned therein. The exemplary method 200 includes at 214, removing the component from the mold, with the casting core positioned internally within the component. Additionally, the exemplary method 200 includes at 216, removing the casting core from the cast component.

Referring again to FIG. 1, in general, the engine 100 may include a core gas turbine engine (indicated generally by reference character 114) and a fan section 116 positioned upstream thereof. The core engine 114 may generally include a substantially tubular outer casing 118 that defines an annular inlet 120. In addition, the outer casing 118 may further enclose and support a booster compressor 122 for increasing the pressure of the air that enters the core engine 114 to a first pressure level. A high pressure, multi-stage, axial-flow compressor 124 may then receive the pressurized air from the booster compressor 122 and further increase the pressure of such air. The pressurized air exiting the high-pressure compressor 124 may then flow to a combustor 126 within which fuel is injected by a fuel system 162 into the flow of pressurized air, with the resulting mixture being combusted within the combustor 126. The high energy combustion products are directed from the combustor 126 along the hot gas path of the engine 100 to a first (high pressure, HP) turbine 128 for driving the high pressure compressor 124 via a first (high pressure, HP) drive shaft 130, and then to a second (low pressure, LP) turbine 132 for driving the booster compressor 122 and fan section 116 via a second (low pressure, LP) drive shaft 134 that is generally coaxial with first drive shaft 130. After driving each of turbines 128 and 132, the combustion products may be expelled from the core engine 114 via an exhaust nozzle 136 to provide propulsive jet thrust.

It should be appreciated that each turbine 128, 132 may generally include one or more turbine stages, with each stage including a turbine nozzle and a downstream turbine rotor. As will be described below, the turbine nozzle may include a plurality of vanes disposed in an annular array about the centerline axis 112 of the engine 100 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 130 or 134).

Additionally, as shown in FIG. 1, the fan section 116 of the engine 100 may generally include a rotatable, axial-flow fan rotor 138 surrounded by an annular fan casing 140. In particular embodiments, the (LP) drive shaft 134 may be connected directly to the fan rotor 138 such as in a direct-drive configuration. In alternative configurations, the (LP) drive shaft 134 may be connected to the fan rotor 138 via a speed reduction device 137 such as a reduction gear gearbox in an indirect-drive or geared-drive configuration. Such speed reduction devices may be included between any suitable shafts/spools within engine 100 as desired or required.

It should be appreciated by those of ordinary skill in the art that the fan casing 140 may be supported relative to the core engine 114 by a plurality of substantially radially-extending, circumferentially-spaced outlet guide vanes 142. As such, the fan casing 140 may enclose the fan rotor 138 and its corresponding fan rotor blades 144. Moreover, a downstream section 146 of the fan casing 140 may extend over an outer portion of the core engine 114 to define a secondary, or by-pass, airflow conduit 148 that provides additional propulsive jet thrust.

During operation of the engine 100, it should be appreciated that an initial air flow 150 (indicated by arrow) may enter the engine 100 through an associated inlet 152 of the fan casing 140. The initial air flow 150 then passes through the fan blades 144 and splits into a first compressed air flow 154 (indicated by arrow) that moves through conduit 148 and a second compressed air flow 156 (indicated by arrow) that enters the booster compressor 122. The pressure of the second compressed air flow 156 is then increased and enters the high-pressure compressor 124 (as indicated by arrow 158). After mixing with fuel and being combusted within the combustor 126, the combustion products 160 exit the combustor 126 and flow through the first turbine 128. Thereafter, the combustion products 160 flow through the second turbine 132 and exit the exhaust nozzle 136 to provide thrust for the engine 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for casting a component, the method comprising: providing a casting core within a cavity of a component mold, wherein the cavity of the component mold defines an outer component shape and the casting core defines an inner component shape, the casting core comprising a core wall, the core wall defining a core outer surface and a core inner surface disposed opposite the core outer surface, wherein the core inner surface defines a core cavity, and wherein the casting core includes a removal facilitation feature; casting the cast component within the cavity of the component mold with the casting core positioned therein; removing the cast component from the component mold, with the casting core positioned internally within the component; and removing the casting core from the cast component.

Clause 2. The method of any preceding clause, wherein the core wall comprises a plurality of core layers.

Clause 3. The method of any preceding clause, wherein the casting core is formed by a core-formation method comprising: inserting an injection apparatus into a core mold, wherein the core mold is formed with a core mold inner face being the negative of a casting core outer shape; low depositing a layer of a core material on the core mold inner face; forming the removal facilitation feature by depositing additional layers of the core material until a core wall thickness of 0.1 mm to 5 mm is established; and removing the casting core from the core mold.

Clause 4. The method of any preceding clause, wherein the removal facilitation feature comprises the core wall having a core wall thickness of 0.1 mm to 5 mm.

Clause 5. The method of any preceding clause, wherein the casting core is formed by an additive manufacturing process.

Clause 6. The method of any preceding clause, wherein the component mold is formed by the additive manufacturing process simultaneously with forming the casting core.

Clause 7. The method of any preceding clause, wherein the casting core is formed by a core-formation method comprising: forming a sub-core comprising a sub-core material; securing the sub-core within a core mold, wherein the core mold is formed with a core mold inner face being the negative of a core outer shape; introducing a core material into the core mold to form the core wall; removing the casting core from the core mold; and leaching the sub-core from the casting core.

Clause 8. The method of any preceding clause, wherein the removal facilitation feature comprises: a support web contained within the core cavity and coupled to the core inner surface.

Clause 9. The method of any preceding clause, wherein the support web is a single structural member with a first support end coupled to a first inner surface attachment location and a second support end coupled to a second inner surface attachment location.

Clause 10. The method of any preceding clause, wherein the support web comprises: a plurality of support members each having a first support end coupled to a first inner surface attachment location and a second support end coupled to a second inner surface attachment location.

Clause 11. The method of any preceding clause, wherein the support web is a ceramic foam or a metallic foam.

Clause 12. The method of any preceding clause, wherein the casting core is formed by a core-formation method comprising: forming a sub-core comprising the support web; securing the sub-core within a core mold having a core mold inner face that is the negative of a core outer shape; introducing a core material into the core mold to form the core outer shape; and removing the casting core from the core mold.

Clause 13. The method of any preceding clause, wherein the casting core and the support web are formed simultaneously by an additive manufacturing process.

Clause 14. The method of any preceding clause, wherein the support web comprises: a plurality of support members each having a first support end coupled to a first inner surface attachment location and a second support end coupled to a second inner surface attachment location, the plurality of support members forming a lattice structure spanning the core cavity.

Clause 15. The method of any preceding clause, further comprising: forming the core wall, the core outer surface, and the core inner surface; and introducing an expanding foam into the core cavity.

Clause 16. The method of any preceding clause, wherein the cast component is a turbine engine component.

Clause 17. The method of any preceding clause, wherein the removal facilitation feature comprises: a first core material having a thickness of 0.1 mm to 5 mm; and a second core material contained within the core cavity, wherein the second core material leaches at a faster rate than the first core material.

Clause 18. The method of any preceding clause, further comprising: forming a sub-core comprising the second core material; securing the sub-core within a core mold having a core mold inner face that is the negative of a core outer shape; introducing the first core material into the core mold to form the core outer shape; and removing the casting core from the core mold.

Clause 19. The method of any preceding clause, further comprising: inserting an injection apparatus into a core mold having a core mold inner face that is the negative of a casting core outer shape; depositing a layer of the first core material on the core mold inner face; depositing additional layers of the first core material until a core wall having a thickness of 0.1 mm to 5 mm is established; introducing the second core material into the cavity; and removing the casting core from the core mold.

Clause 20. The method of any preceding clause, wherein the casting core is formed by an additive manufacturing process.

What is claimed is:

1. A method for casting a component, the method comprising:
   casting a cast component within a cavity of a component mold with a casting core positioned therein, wherein the cavity of the component mold defines an outer component shape and the casting core defines an inner component shape, the casting core comprising:
      a core wall defining a core outer surface and a core inner surface disposed opposite the core outer surface, wherein at least the core outer surface comprises a first core material, and wherein the core inner surface defines a core cavity and comprises a second core material that leaches at a faster rate than the first core material; and
      a removal facilitation feature comprising a support web contained within the core cavity and coupled to the core inner surface, wherein the support web also comprises the second core material;
   removing the cast component from the component mold, with the casting core positioned internally within the component; and
   removing the casting core from the cast component;
   wherein the casting core is formed by a core-formation method comprising:
      inserting an injection apparatus into a core mold, wherein the core mold is formed with a core mold inner face being a negative of a casting core outer shape;
      depositing a layer of the first core material on the core mold inner face;
      forming the removal facilitation feature by:
         depositing additional layers of the first core material and/or the second core material until a core wall thickness of 0.1 mm to 5 mm is established;
         forming a sub-core onto the additional layers, the sub-core including the support web; and
         integrating the support web to the additional layers; and
      removing the casting core from the core mold.

2. The method of claim 1, wherein the core wall comprises a plurality of core layers.

3. The method of claim 1, wherein the support web is a single structural member with a first support end coupled to a first inner surface attachment location and a second support end coupled to a second inner surface attachment location.

4. The method of claim 1, wherein the support web comprises:
   a plurality of support members each having a first support end coupled to a first inner surface attachment location and a second support end coupled to a second inner surface attachment location.

5. The method of claim 1, wherein the support web is a ceramic foam or a metallic foam.

6. The method of claim 1, further comprising:
   forming the core wall, the core outer surface, and the core inner surface; and
   introducing an expanding foam into the core cavity.

7. The method of claim 1, wherein the cast component is a turbine engine component.

8. The method of claim 1, wherein the support web is attached to the core inner surface at a plurality of surface attachment locations.

9. The method of claim 8, wherein a location of the core inner surface that is separate from the plurality of surface attachment locations comprises the second core material.

10. The method of claim 1, wherein the removal facilitation feature comprises only the second core material.

11. A method for casting a component, the method comprising:
    casting a cast component within a cavity of a component mold with a casting core positioned therein, wherein the cavity of the component mold defines an outer component shape and the casting core defines an inner component shape, the casting core comprising:
       a core wall defining a core outer surface and a core inner surface disposed opposite the core outer surface, wherein at least the core outer surface comprises a first core material, and wherein the core inner surface defines a core cavity and comprises a second core material that leaches at a faster rate than the first core material; and
       a removal facilitation feature comprising a support web contained within the core cavity and coupled to the core inner surface, wherein the support web also comprises the second core material;
    removing the cast component from the component mold, with the casting core positioned internally within the component; and
    removing the casting core from the cast component;
    wherein the casting core is formed by a core-formation method comprising:
       inserting an injection apparatus into a core mold, wherein the core mold is formed with a core mold inner face being a negative of a casting core outer shape;
       depositing a layer of the first core material on the core mold inner face;
       forming the removal facilitation feature by:
          depositing additional layers of the first core material and/or the second core material;
          forming a sub-core onto the additional layers, the sub-core including the support web, wherein the support web is a ceramic foam or a metallic foam; and
          integrating the support web to the additional layers; and
    removing the casting core from the core mold.

* * * * *